Figure 1:
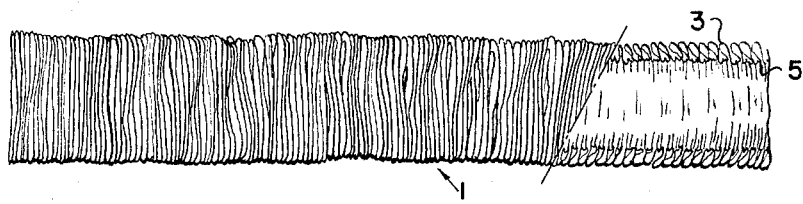

Sept. 20, 1966    C. M. ALSYS    3,274,005
SHIRRED SAUSAGE CASING WITH END CLOSURE
Filed April 1, 1964    3 Sheets-Sheet 1

CLARENCE M. ALSYS
INVENTOR.

BY

HIS ATTORNEY

Sept. 20, 1966   C. M. ALSYS   3,274,005
SHIRRED SAUSAGE CASING WITH END CLOSURE
Filed April 1, 1964   3 Sheets-Sheet 2

CLARENCE M. ALSYS
INVENTOR.

BY

HIS ATTORNEY

Sept. 20, 1966          C. M. ALSYS          3,274,005
SHIRRED SAUSAGE CASING WITH END CLOSURE
Filed April 1, 1964          3 Sheets-Sheet 3

CLARENCE M. ALSYS
INVENTOR.

BY

HIS ATTORNEY

United States Patent Office 3,274,005
Patented Sept. 20, 1966

3,274,005
SHIRRED SAUSAGE CASING WITH END
CLOSURE
Clarence M. Alsys, Danville, Ill., assignor to Tee-Pak,
Inc., Chicago, Ill., a corporation of Illinois
Filed Apr. 1, 1964, Ser. No. 356,510
8 Claims. (Cl. 99—176)

This invention relates to new and useful improvements in shirred synthetic sausage casings and more particularly to the closure of the end of a shirred sausage casing.

Artificial tubular casings, particularly sausage casings formed of regenerated cellulose, are prepared as hollow, thin-walled tubes of very great length. For convenience in handling and in filling, these casings are shirred from lengths ranging from 40 to 160 ft. or more down to a shirred and compressed length of the order of a few inches.

An early type shirring machine and the resulting shirred product are shown in Dietrich U.S. Patent 2,010,626. Improved forms of shirring machines and the shirred products produced thereby are shown in Korsgaard U.S. Patent 2,583,654; Blizzard et al. U.S. Patents 2,722,714, 2,722,715, and 2,723,201; Gimbel U.S. Patent 2,819,488; and Matecki U.S. Patents 2,983,949 and 2,984,574.

After a casing is shirred it is packaged and shipped to a meat packing house where an individual shirred strand is placed on a stuffing horn and a meat emulsion extruded to fill the casing to its fully extended length. The stuffing of the casing usually takes place within a few seconds with the result that the casing is extended from a shirred length from 8 to 27 inches to an extended length of 40 to 160 ft. or more in a matter of 3 to 12 sec. This rapid extension of the casing during stuffing requires the casing to be especially strong and resistant to tearing.

Recently, machines have been developed for automatic stuffing of sausage casings with meat emulsion and machines are well known for automatic linking of sausages and stripping of casings therefrom. Townsend U.S. Patent 3,115,668 discloses a radically new machine which stuffs and links automatically. The Townsend machine stuffs a shirred casing with sausage meat emulsion and forms the stuffed casing into sausage links for further processing.

In automatic sausage stuffing machines of all types, and in the Townsend machine in particular, there is a need for a shirred casing having an end closure so that the shirred casing strand can merely be placed on the stuffing horn and filled with sausage emulsion without further action by the stuffing machine operator. In the past it has been necessary for the stuffing machine operator to close the end of the casing in some manner, or to hold it closed manually until sufficient sausage emulsion has been extruded into the end of the casing to restrict further flow of the meat emulsion out of the casing. The open end of shirred casing strands cannot be closed by metal clips or staples due to the fact that the meat is recovered and reprocessed from the casing end portions which normally do not fill out sufficiently to make complete sausages. If metal clips or staples were used to close the end of casings there would be danger of such pieces of metal finding their way into sausages made from the meat in the end portions.

Accordingly, it is one object of this invention to provide a new and improved method of closing an end of a shirred strand of a tubular casing.

Another object of this invention is to provide an improved method for closing the end of a shirred strand of sauage casing utilizing only the material of the casing in the closure.

Still another object of this invention is to provide a new and improved shirred strand of tubular casing having a novel end closure.

A feature of this invention is the provision of an improved method for closing an end of a shirred strand of tubular casing by forming an inverted, i.e., inturned internal twist of the end portion of the casing material.

Another feature of this invention is the provision of an improved shirred strand of tubular casing having an end closure formed of the casing material by an inverted internal twist of the material.

Other objects and features of this invention will become apparent from time to time throughout the specification and claims as hereinafter related.

In the accompanying drawings there are shown two embodiments of the improved method for closing the end of a shirred strand of tubular casing. The drawings are partially in elevation and partially in section. The shirred casings are of a film material which is so thin that it is impractical to show any thickness to the material in the views which are in section.

Figure 2:
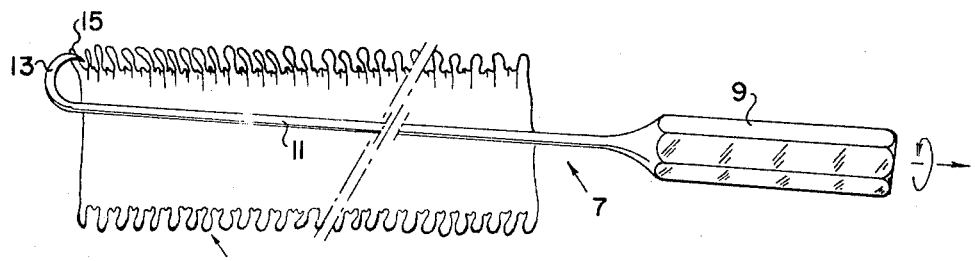
Figure 3:
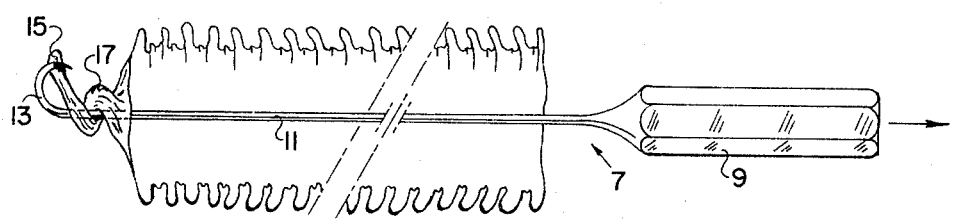
Figure 4:
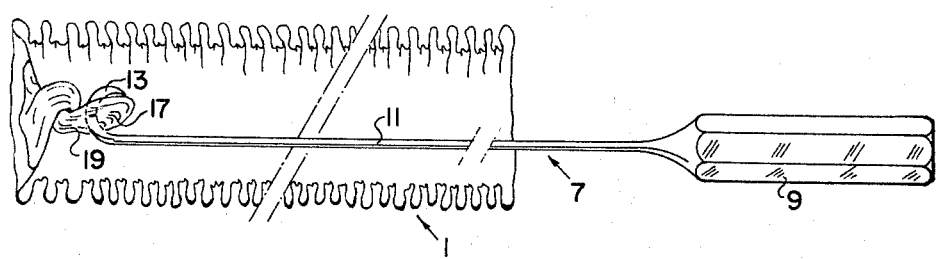
Figure 6:
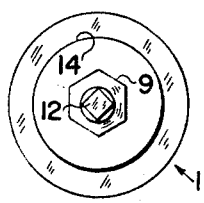
Figure 5:
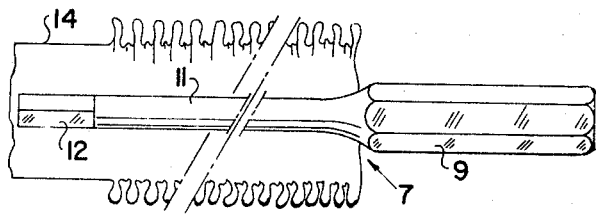
Figure 7:
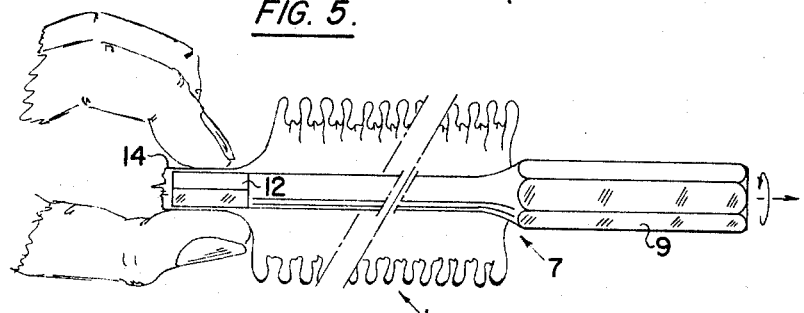
Figure 8:
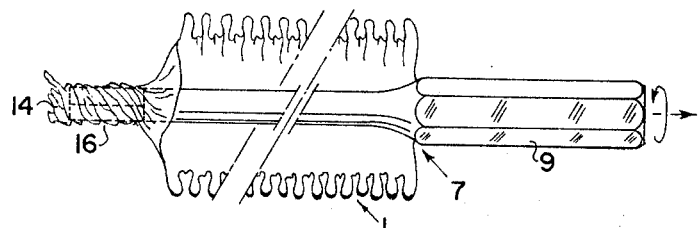
Figure 9:
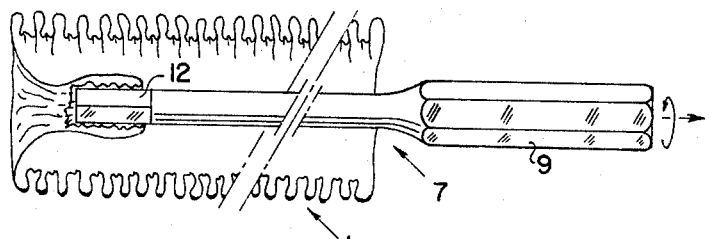
Figure 10:
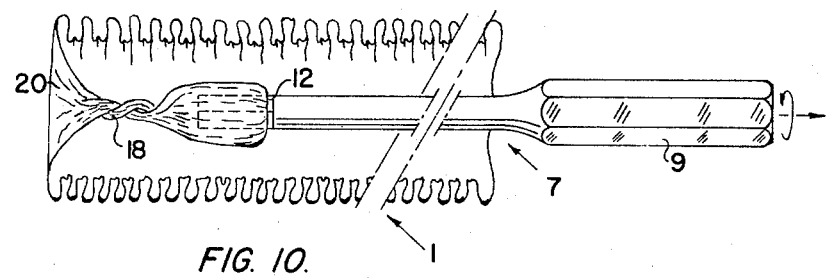
Figure 11:
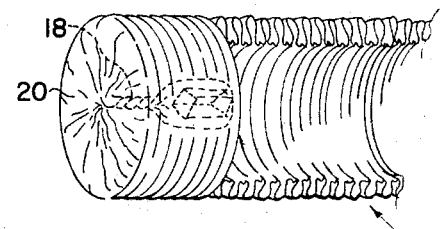
Figure 12:
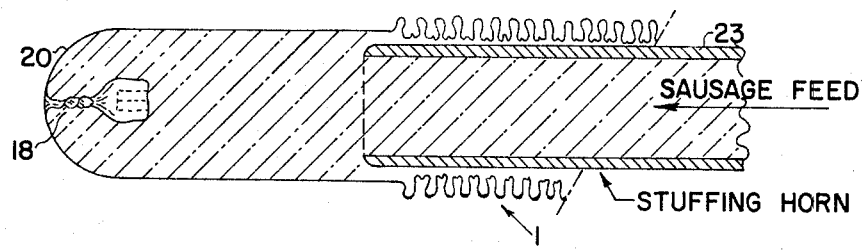

FIG. 1 is a view partially in elevation and partially in section of a strand of shirred tubular casing, FIG. 2 is a view in section of casing as shown in FIG. 1 with a tool inserted in position to effect closure of the casing end, FIG. 3 is a sectional view similar to FIG. 2 showing movement of the tool to twist the end of the casing closed, FIG. 4 is a sectional view similar to FIGS. 2 and 3 showing the twisting tool moved within the end of the casing to form an inverted twisted closure, FIG. 5 is a sectional view similar to FIG. 2 using a different tool for forming the casing end closure, FIG. 6 is an end view of the casing and tool shown in FIG. 5, FIG. 7 is a view, partially in section, showing the initial use of the twisting tool in closing the end of the casing, FIG. 8 is a sectional view of the tool and casing as shown in FIG. 7 with the end of the casing secured to the tool, FIG. 9 is a sectional view of the tool and casing shown in FIGS. 5 to 8 with the end of the casing pulled inside the shirred strand, FIG. 10 is a sectional view of the casing shown in FIGS. 5 to 9 with the tool moved to a position where the inverted twist closure is formed in the casing end, FIG. 11 is a view partially in elevation and partially in section of a shirred strand of casing as shown in FIGS. 5 to 10 with an end closure formed by the method of this invention, and FIG. 12 is a view in section showing the shirred strand of casing with end closure formed in accordance with this invention placed on a stuffing horn to be filled with sausage emulsion.

Referring to the drawings by numerals of reference and more particularly to FIG. 1 there is shown a shirred strand of tubular casing 1 having a plurality of circumferentially disposed major pleats 3 and minor pleats 5. The casing 1 is preferably a tubular regenerated cellulose casing of the type used in the preparation of sausages. This invention, however, is applicable to any shirred tubular material, such as tubular films of amylose, starch, polyvinyl alcohol, alginates, cellulose derivatives, gelatin, collagen, casein, zein, or plastic films including polystryene, polyvinyl chloride, saran, polyethylene, polypropylene, polyesters, nylon, etc.

The plastic films just mentioned are not customarily used in the preparation of sausages but are useful for packaging other materials and therefore can be used in the method of this invention.

In one form of this invention, as shown in FIGS. 2 to 4, the end of the shirred casing strand is closed by forming an internally twisted closure using a hook-like tool. In FIG. 2 there is shown a tool 7 having handle 9 and rod portion 11 teminating in an end hook 13. As shown in FIG. 2, tool 7 is inserted through shirred casing 1 and hook 13 is hooked into an edge portion of the end of the casing as shown at 15. The tool 7 is then twisted to close the end of the casing by a twist as shown at 17 in FIG. 3. During this twisting movement tool 7 is moved relative to casing 1 to withdraw the twisted portion of casing inside the end of the casing, preferably inside the end of the shirred portion of the casing.

As the tool 7 is twisted and the twisted end portion 17 of casing 1 pulled inside, an inverted, i.e. inturned, twist is formed in casing 1 as shown at 19 in FIG. 4. If desired, pressure may be applied against the closed end during formation of twist 19 to increase tightening of the twisted closure. After this inverted internal twist is formed, tool 7 is removed from the twisted closure and the casing is ready for storage, shipment, and use. Because of the fact that the closure is formed by an inverted internal twist, it is resistant to being opened by extrusion of meat into the casing in the sausage stuffing operation.

In FIGS. 5 to 11 of the drawing there is shown an alternate embodiment of the method of this invention for closing the end of a shirred strand of casing. In this embodiment of the invention a shirred strand of casing 1 is shown in section in FIGS. 5, 7, 8, 9, 10 and 11. In FIG. 5 a twisting tool 7 having a handle 9 is inserted through the interior of the shirred strand. A portion 14 of casing is deshirred as shown in FIG. 5. Tool 7 has handle 9 and rod-like portion 11 terminating in an end portion 12 of noncircular cross section. The relationship of the end portion 12 to the deshirred casing 14 is shown in more detail in FIG. 6.

The end portion 12 of tool 7 is shown as being square in cross section. This end portion, however, can be any suitable noncircular shape which will provide a gripping surface, having a substantial amount of friction, to which the causing can be secured. The end portion 12 can even be of generally circular cross section if it is roughened or knurled to provide a suitable surface to hold the casing during the twisting operation. Also, the end portion 12 is of a suitable shape (e.g. straight or tapered) permitting easy withdrawal of the tool from the casing after the twisting operation is complete.

When this tool is used to close the end of the casing the operator presses the deshirred portion 14 of the casing against end portion 12 of tool 7 as shown in FIG. 7. While holding the casing in this position, the operator twists tool 7 as shown by the directional arrow in FIG. 7. This results in end portion 14 being twisted as shown at 16 to form a tight connection to end portion 12 of tool 7.

While tool 7 is being rotated as shown in FIG. 8 it is withdrawn to pull the end portion of the casing into the interior of the shirred strand as shown in FIG. 9. Continued twisting of tool 7 causes an inverted internal twist 18 to form in the casing which closes the end of the casing as shown at 20 in FIGS. 10 and 11. When a tight twist is formed in the end of the casing as shown in FIGS. 10 and 11, tool 7 is withdrawn.

After tool 7 is withdrawn from the casing, the shirred strand has the general appearance shown in FIG. 11. The end closure 20 formed by inverted internal twist 18 is shown in FIG. 11 with the remainder of the shirred strand 1 being shown in section.

When a shirred strand of casing having an internally twisted end closure as shown in FIG. 4 or FIG. 11 is placed on a stuffing horn 23 and filled with sausage as indicated by the directional arrow in FIG. 12 the casing is filled with sausage emulsion and extended from a shirred length of a few inches to a filled length of 40 to 160 ft. or more in a matter of a few seconds. In FIG. 12 the casing is shown as it is initially feeding off of the stuffing horn and filled with sausage emulsion. The sausage emulsion fills the casing to its end and the pressure of meat tends to hold the twisted portion shut rather than to open it as would be the case if the casing were closed by an external twist.

In the description of the operation of tool 7 relative to shirred strand of casing 1 as described for both embodiments of the invention, it should be noted that the closure is effected by twisting the end portion of the casing. The motion involved is that of relative movement of the tool and shirred casing strand. The method has been described with reference to a stationary strand of casing and a rotating and reciprocally movable tool. The equivalent of this motion can obviously be obtained using a stationary tool and rotating and reciprocally moving the shirred casing strand. In the description as set forth in the specification and in the claims which follow, therefore, all reference to motion of the tool and the strand is a matter of relative motion and is intended to define motion of the tool relative to the casing or of the casing relative to the tool. In closing the casing by a twist closure the casing may be twisted and inverted or may be inverted and then twisted to form a closure solely of the casing material positioned within the end of the bore of the casing.

While this invention has been described with special emphasis upon two preferred embodiments, I wish it to be understood that within the scope of the appended claims the invention may be practiced otherwise than as specifically described herein.

What is claimed is:

1. A method of closing an end of a shirred strand of synthetic tubular meat casing to render said end substantially closed to the passage of meat emulsion therethrough, which comprises turning a portion of the casing inwardly within the bore of said strand and forming a closure of the casing portion positioned therein.

2. A method of closing an end of a shirred strand of synthetic tubular meat casing which comprises pulling an end portion of the casing to invert the same within the end and twisting the inverted portion of casing to produce a twisted closure inverted within said end portion.

3. A method in accordance with claim 2 in which a rod shaped tool is positioned within the casing strand and said casing end portion secured to said tool, and said tool withdrawn and rotated relative to said casing to produce said inverted twisted closure.

4. A method in accordance with claim 3 in which said tool includes a hook for pulling and twisting said casing end portion.

5. A method in accordance with claim 3 in which said casing end portion is secured to said tool by twisting, and the tool withdrawn and twisted to effect said inverted twisted closure, and subsequently withdrawn from said closure.

6. A method in accordance with claim 5 in which said tool has a non-circular end portion and said casing is pressed against said tool end portion and twisted to secure the casing to said tool.

7. A shirred strand of synthetic tubular meat casing having an end closure comprising an end portion of said casing substantially closed to the passage of meat emulsion therethrough, inturned, and positioned within the bore of said strand.

8. An improved closed end hollow shirred meat casing strand having a closure of integral casing material inturned and anchored within one end of the bore of said strand, said closure substantially blocking the flow of meat emulsion therethrough.

(References on following page)

References Cited by the Examiner

UNITED STATES PATENTS

| | | | |
|---|---|---|---|
| 2,706,370 | 4/1955 | Snyder | 53—29 X |
| 2,977,233 | 3/1961 | Vaessen | 99—176 X |
| 3,162,893 | 12/1964 | Townsend | 99—176 X |

OTHER REFERENCES

"The National Provisioner," February 29, 1964, page 15.

A. LOUIS MONACELL, *Primary Examiner.*

HYMAN LORD, *Examiner.*